United States Patent
Jesuraj

(10) Patent No.: US 7,929,420 B2
(45) Date of Patent: Apr. 19, 2011

(54) METHOD AND APPARATUS FOR LEARNING VRRP BACKUP ROUTERS

(75) Inventor: Ramasamy Jesuraj, Westford, MA (US)

(73) Assignee: Avaya, Inc., Basking Ridge, NJ (US)

( * ) Notice: Subject to any disclaimer, the term of this patent is extended or adjusted under 35 U.S.C. 154(b) by 309 days.

(21) Appl. No.: 11/701,620

(22) Filed: Feb. 2, 2007

(65) Prior Publication Data
US 2007/0230472 A1 Oct. 4, 2007

Related U.S. Application Data

(60) Provisional application No. 60/764,640, filed on Feb. 2, 2006.

(51) Int. Cl.
*H04L 12/28* (2006.01)
*H04L 12/56* (2006.01)
*H04L 12/26* (2006.01)
*G10L 11/06* (2006.01)
*G10L 19/12* (2006.01)
*G01R 31/28* (2006.01)

(52) U.S. Cl. ........ 370/218; 370/255; 370/392; 370/409; 709/208; 709/221; 709/223; 714/4

(58) Field of Classification Search .......... 370/216–228, 370/241–253, 392, 255, 409; 709/208, 221, 709/223; 714/4
See application file for complete search history.

(56) References Cited

U.S. PATENT DOCUMENTS

| | | | |
|---|---|---|---|
| 2004/0008694 A1* | 1/2004 | Guo | 370/395.52 |
| 2005/0117598 A1 | 6/2005 | Iijima et al. | |
| 2005/0265230 A1* | 12/2005 | Na et al. | 370/219 |
| 2006/0104210 A1* | 5/2006 | Nielsen | 370/248 |
| 2006/0149851 A1* | 7/2006 | Matsumoto et al. | 709/238 |
| 2006/0155828 A1 | 7/2006 | Ikeda et al. | |
| 2006/0258352 A1* | 11/2006 | Ishii | 455/435.1 |
| 2007/0008880 A1* | 1/2007 | Buchko et al. | 370/218 |
| 2007/0104146 A1* | 5/2007 | Hossain et al. | 370/331 |

OTHER PUBLICATIONS

*Virtual Router Redundancy Protocol (VRRP)*, Internet Engineering Task Force (IEFT) Request for Comments (RFC) 3768, Apr. 2004, (26 pages).
*Virtual Router Redundancy Protocol for IP v6*, IEFT Internet Draft (ID) <draft-ietf-vrrp-ipv6-spec-07.txt> Sep. 28, 2004, (30 pages).

(Continued)

*Primary Examiner* — Alpus H Hsu
*Assistant Examiner* — Saad Hassan
(74) *Attorney, Agent, or Firm* — Anderson Gorecki & Manaras LLP

(57) ABSTRACT

A method and apparatus for learning the identity of VRRP backup router(s) for a VRRP master router enables the identity of VRRP backup routers to be determined quickly on demand, or enables a table of VRRP master and backup routers to be established over time. A VRRP query message type is defined as a type of VRRP message that will enable the routers on the network to be queried to determine which router(s) are VRRP backup routers for a virtual IP address associated with a VRRP master. The VRRP query message may be initiated by the VRRP master, a network management system, or another entity. The VRRP backup routers may respond with a VRRP response message, which is also defined as a type of VRRP message. The VRRP response message may be unicast to the VRRP master or network management system, or broadcast to enable a table of VRRP master/backup routers to be created.

18 Claims, 3 Drawing Sheets

OTHER PUBLICATIONS

*VRRP Extension to Support Dynamic Topology Changes of Virtual Router Topology*, IETF ID <draft-ietf-vrrp-ext-00.txt> Jun. 1999, (8 pages).

*Reliability and Load Balance among multiple Home Agents*, IETF ID <draft-deng-mip6-vrrp-homeagent-reliability-00.txt> Jul. 11, 2005, (20 pages).

* cited by examiner

Legend:
VRID = Virtual Router Identifier
DR = Default Router
VIP = Virtual IP Address

METHOD AND APPARATUS FOR LEARNING VRRP BACKUP ROUTERS

BACKGROUND OF THE INVENTION

1. Field of the Invention

The present invention relates to communication networks and, more particularly, to a method and apparatus for learning the identity of VRRP backup router(s) for a VRRP master router.

2. Description of the Related Art

Data communication networks may include various computers, servers, nodes, routers, switches, hubs, proxies, and other network devices coupled to and configured to pass data to one another. These various devices will be referred to herein as "network elements." Data is communicated through the data communication network by passing data packets (or data cells or segments) between the network elements by utilizing one or more communication links interconnecting the network elements. A particular packet may be handled by multiple network elements and cross multiple communication links as it travels between its source and its destination over the network.

FIG. 1 illustrates an example network 10, including a Local Area Network (LAN) 12 that is connected to an external network such as the Internet 14 by two network elements 16. Although an example will be provided in which a LAN is connected to the Internet, the LAN may also be connected to another type of network. For convenience, the network elements will be referred to as routers, although other types of network elements may be used to implement the network elements 16. The routers 16 may be separate physical entities or may be virtual routers implemented as separate processes or separate threads in a process that provide the illusion that a dedicated router is available to satisfy the needs of the network(s) to which it is connected Hosts 18 connect to the LAN 12 and are able to access the external network 14 via one or more of the routers 16. However, since there is more than one router 16 interconnecting the LAN with the external network, the host will need to learn which router 16 should be used to access a particular destination or set of destinations. For example, each of the routers 16 may be established to handle traffic for a particular Virtual Private Network or for a particular group of hosts. Thus, the host will need to know the IP address (or MAC address) of the router 16 that it is required to use to communicate with a particular destination.

There are several ways in which the routers may be assigned to handle traffic for a particular host or set of hosts. For example, an Internet Control Messaging Protocol (ICMP) router discover client may be used to discover routes through the network to an IP address, or a statically configured default route may be used from the host to one of the routing entities. However, the static default routes have the disadvantage of needing to be reestablished if the routing entity goes down or in the event of another fault on the network.

Another way to assign routers to handle traffic for particular groups of hosts is to run a dynamic routing protocol on the LAN 12, such that if a particular router or routing entity goes down, a substitute routing entity may take over for that routing entity. Dynamic routing protocols generally enable the network elements to establish connectivity and allow the network elements to determine paths through the network. A few examples of dynamic routing protocols include Open Shortest Path First (OSPF), Routing Information Protocol (RIP), Intermediate System to Intermediate System (IS-IS), although other dynamic routing protocols may exist as well.

When a dynamic routing protocol is in use on the network, and one of the routing entities goes down, the dynamic routing protocol will automatically reconfigure routes through the network so that a new route to the IP address (via a different routing entity) may be used by the host.

Unfortunately, there are situations where it may not be optimal to run a dynamic routing protocol on the network. For example, dynamic routing protocols introduce security concerns and may take time to converge after a change in network topography. In a network that is frequently changing, for example where virtual routers are constantly being added or deleted from the network elements, it may be difficult to run a dynamic routing protocol.

One way to avoid using a dynamic routing protocol is to cause the hosts to address data intended to be transmitted to the external network to a virtual IP address, and then allow the routers to dynamically assume responsibility for the virtual IP addresses on the LAN. By allowing the routers to dynamically assume responsibility, an available router may assume responsibility for a virtual IP address and, if that router becomes unavailable for some reason, another router may take over responsibility without requiring the failover to be coordinated with the host.

One protocol that enables the routers to assume responsibility for IP addresses in this manner is commonly referred to as Virtual Router Redundancy Protocol (VRRP). VRRP was defined to enable hosts to transmit data to a virtual IP address, and to enable routers to dynamically assume responsibility for the virtual IP address. In this scenario, the host will transmit data onto the LAN, and routers will look for data addressed to the virtual IP address or virtual MAC address for which they are responsible. VRRP is defined in greater detail for IPv4 in IETF RFC 3768 and for IPv6 in IETF Internet Draft draft-ietf-vrrp-ipv6-spec-07.txt, the content of each of which is hereby incorporated herein by reference.

In VRRP, one router will be elected as the master router for a particular address, and other routers will become backup routers for that address. Generally, there is at least one backup router for each master, although multiple backup routers may exist for a given master router. The master router periodically advertises mastership of the set of addresses that it is master over, to enable the backup routers to determine that the master is still functioning. When the backup routers do not receive an advertisement from the master for a period of time, the backup routers will presume that the master has failed and will take over responsibility for the associated IP address. Once the backup has taken over for the master, it will forward traffic addressed to the associated virtual "IP address and respond to ARP requests for that virtual IP address.

FIG. 2 shows a configuration with three routers running VRRP to provide a redundant gateway for the hosts on the LAN. In this example, routers A and B are backed up by router C. The hosts 18 on the LAN are splitting their traffic between the routers A and B. According to this example, half of the hosts have been configured to have router A as their default gateway and the other half have been configured to have router B as their default gateway. Two virtual routers have been configured with VRID 27 and 28. VRRP router with VRID 27 is backing up IP address 192.168.1.20, and VRRP router with VRID 28 is backing up IP address 192.168.1.24. The addresses being backed up are called the virtual IP addresses. In this case, since router A owns 192.168.1.20 (that is its physical interface address) it will assert itself as master for VRID=27 and router B will assert itself as master for VRID 28 for the same reason.

As described in greater detail in the VRRP specifications, once a group of routers has been established for a given IP address, one of the routers will assume the role of master for that IP address and the other routers will be backups. The master router will advertise a virtual MAC address associated with the IP address so that traffic to the IP address will be learned on ports leading to the master router. In this way, traffic may be routed through the network to cause traffic addressed to the IP address to pass through the master router.

The master router will also advertise mastership of the virtual IP address by broadcasting an advertisement on the network. Backup routers on the network will listen for the VRRP advertisements from the master, which enable the VRRP master to advertise the priority and the state of the master router associated with the virtual router ID. When the backup routers notice an absence of advertisements from the master for a certain period of time, the backup routers elect a new master based on an election process defined in the RFC. Once the election process has completed, the winning backup router will automatically assume responsibility for the Virtual Router ID so that a failover from the master to the backup may be performed automatically, simply by causing the backup router to become the master router and assume responsibility for forwarding traffic addressed to the virtual IP address.

Since the IP address has not changed, the hosts will not be affected by the change in responsibility occasioned by the failover, and accordingly the failover from master to backup is transparent to the hosts.

VRRP may be used as shown in FIG. 2 to enable routers to be backed up on a network. Additionally, within a network element, a given network element may implement hundreds or thousands of virtual routers. VRRP may thus be run within the network element itself to determine which of the routers should be masters and which should be backups, so that backup and virtual routers may be established for the master virtual routers without requiring complicated interdependencies from a control/management standpoint to be established. Rather, the virtual routers on the network element may simply run VRRP and determine automatically which of the virtual routers will be the master for a given virtual IP address and which will back up the master router.

Since the VRRP protocol specifies that master routers are to transmit advertisement messages periodically to maintain mastership over their IP addresses, it is easy from a control/management standpoint to determine which router is the master of a particular IP address by simply listening for VRRP advertisements on the LAN. However, the backup routers do not transmit any information of this nature and, accordingly, determining which routers are backups for a particular master or determining whether there are any backups for a particular master is more complicated. Where there are only a few routers and the master/backup relationship has been explicitly defined, this is probably not an issue. However, as the number of routers increases and as the routers begin to self-assign responsibility for backing up the master routers on the network, the task of identifying the backup routers may become increasingly more difficult.

Since the standard does not provide for the standby routers to send out any messages while the master router is alive, the master router does not have any information about the existence of backup router(s) and cannot provide the identity of the VRRP backup routers. If the system administrator of the master router wants to take down the connection to the LAN for some reason, for example to perform regular maintenance, upgrade, or trouble shooting, the system administrator may have difficulty identifying which routers are VRRP backup routers for a particular VRRP master router. For example, the network administrator may need to access the other routers using a network management system to determine which routers are backing up the VRRP master router. This can be a tedious, laborious, time consuming and error prone activity.

SUMMARY OF THE INVENTION

The present invention overcomes these and other drawbacks by providing a method and apparatus for learning the identity of VRRP backup router(s) for a VRRP master router. According to an embodiment of the invention, a VRRP query message type is defined as a type of VRRP message that will enable the routers on the network to be queried to determine which router(s) are VRRP backup routers for a virtual IP address associated with a VRRP master. The VRRP query message may be broadcast on the network to all VRRP routers or unicast on the network to the VRRP routers. The VRRP query message may be initiated by the VRRP master, by a network management system, or by another entity on the network. The VRRP routers that are VRRP backup routers for the IP address may respond with a VRRP response message, which is also defined as a new type of VRRP message. The VRRP response message may be unicast to the VRRP master, unicast to the network management system, broadcast on the network, or multicast to group of network elements such as all other VRRP routers in a particular VRRP group. Defining VRRP query and VRRP response message types enables the identity of VRRP backup routers to be determined quickly on demand, or enables a table of VRRP master and backup routers to be established over time.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 3:
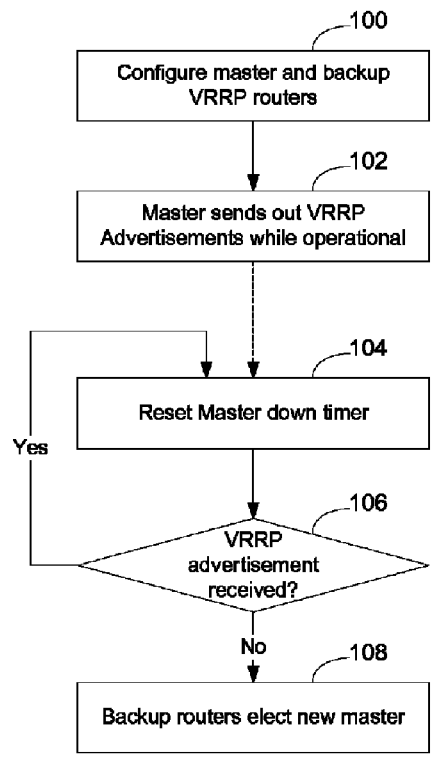
FIG. 3 is a flowchart of the process used by VRRP to communicate the presence of a VRRP master for an IP address.

As discussed above, VRRP enables two or more routers to automatically select one of the routers to act as a master and one or more other routers to serve as backup routers for the master. A problem with the current implementation of VRRP is that VRRP does not enable the master or another device on the network such as a network management station 20 to determine which routers are configured to operate as backup routers for the master. The manner in which VRRP operates is summarized in FIG. 3. As shown in FIG. 3, the master and backup routers are initially configured (100) using an automatic or manual process. Thereafter, the master routers will send out VRRP advertisements as long as they are operational (102). The VRRP advertisement format is described below in connection with FIG. 5 in greater detail. Basically, the VRRP master will advertise those IP addresses that it is master of, to enable other routers to know that the VRRP master has not experienced failure.

When a VRRP backup router receives a VRRP advertisement from the VRRP master, it will reset its master-down-timer (104) and wait for a subsequent VRRP advertisement from the master. Each time a VRRP advertisement is received (106) the VRRP backup router will reset the master-down-timer (104). If a VRRP advertisement is not received before the master-down-timer expires, the VRRP backup routers will elect a new master router, which will then assume responsibility for responding to ARP requests, forwarding packets, etc., associated with one or more virtual IP addresses associated with the previous VRRP master router.

As described in greater detail below, the invention enables a user to determine whether there are any backup routers for a given master VRRP router, and to determine their identity. According to an embodiment of the invention, the master router may send out a VRRP query message having a new VRRP type value (120). In response to the VRRP query message, the backup routers for the VRRP master may respond using a VRRP response message also having a new VRRP type value. By enabling the VRRP master to cause the VRRP backups to respond, it is possible to enable the VRRP master to learn which Virtual Routers are currently acting as backups for the VRRP master.

Figure 4:
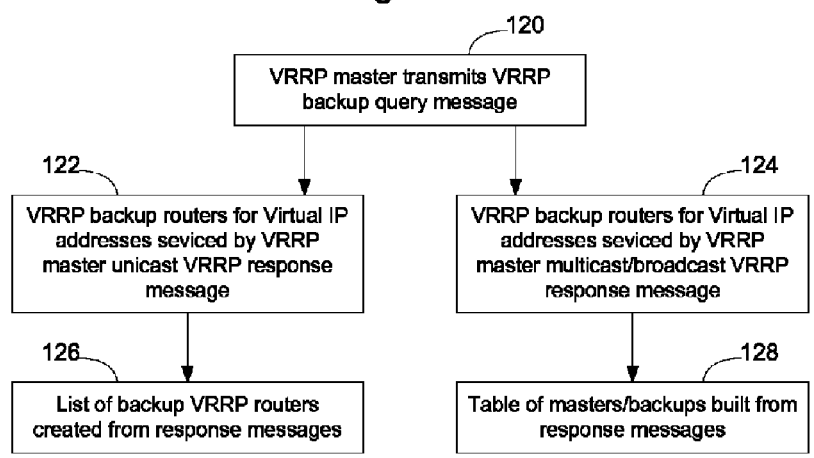
FIG. 4 is a flowchart of an example process that may be used to determine which VRRP routers are VRRP backup routers for a VRRP master according to an embodiment of the invention.

FIG. 4 illustrates a method that may be used to enable the VRRP backup routers to be determined for a given VRRP master. In the embodiment shown in FIG. 4, when it is necessary to determine the VRRP backup routers for a particular VRRP master, a VRRP backup query message may be transmitted on the LAN (120). The VRRP backup query message may be transmitted by the VRRP master, may be transmitted by a network management system, or may be generated and transmitted by another entity on the network. According to one embodiment, the VRRP master may be instructed to generate and transmit the VRRP backup query message by the network management system, although the invention is not limited to the particular way in which the VRRP query message is initiated.

The VRRP backup query message will contain a list of virtual IP routers associated with a given VRRP master router. Upon receipt of the VRRP backup query message, the VRRP backup routers for the virtual IP addresses serviced by the VRRP master router will respond with a VRRP response message. The VRRP response message may be unicast on the network, such as to the VRRP master router or to the network management system (122) or may be broadcast or multicast on the network so that the VRRP response message is received by all or a select number of routers on the network (124).

If the VRRP response message is unicast on the network, such as where the VRRP response messages are sent back to the network element that created the VRRP message, a list of VRRP backup routers may be created from the VRRP response messages (126). Alternatively, where the VRRP response messages are broadcast/multicast on the network, the VRRP routers that receive the VRRP response message may use the contents of the VRRP response message to update VRRP backup tables (128) so that one or more VRRP routers and/or the network management system may maintain a VRRP backup table containing a then current correlation between VRRP master routers and VRRP backup routers.

According to an embodiment of the invention, a master router sends a message in the LAN to identify possible backup routers. Each router configured with VRRP on that LAN may response to the message with its priority and, optionally, other configuration information for example the priority (see section 5.2.4 of the RFC) and advertisement interval (see section 5.3.7 of the RFC). Based on the responses, the router that is attempting to determine its backup(s) may build up a knowledge base of the VRRP routers in the LAN. The priority values help to identify the high priority backup routers. The advertisement timer value helps to identify any mis-configuration of backup routers.

Alternatively, the system administrator may issue an operational command via the network management system, which may be translated into a VRRP message and sent out on the LAN. The VRRP message in this embodiment may be sent directly by the network management system, sent via the VRRP master, or sent via another VRRP router. The reply may be a VRRP message, and the result may be displayed for further action by the system administrator via the network management system 20.

Figure 5:
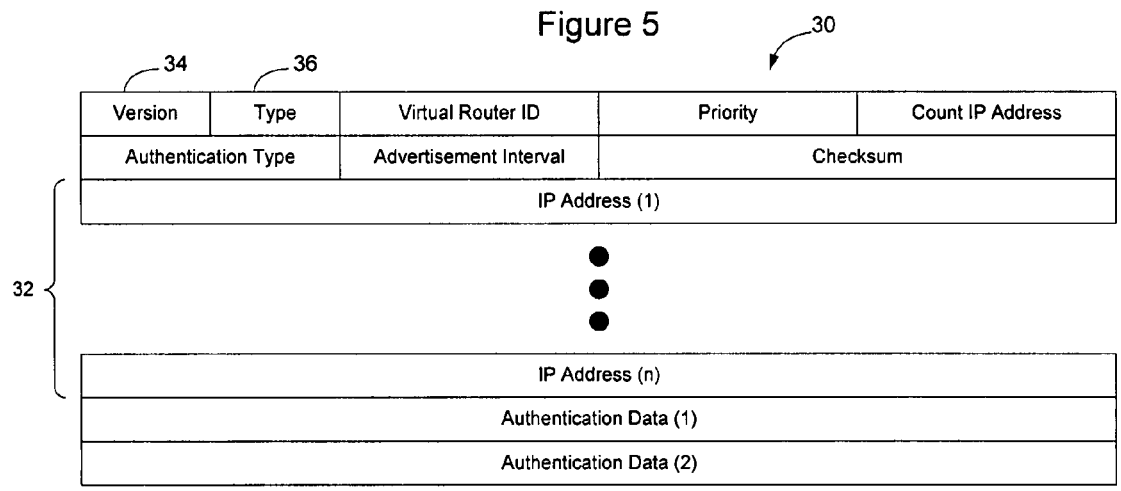
FIG. 5 is a block diagram of a VRRP message.

FIG. 5 illustrates the VRRP message 30 in greater detail. The VRRP message is defined in the several RFCs, and additional details associated with the various fields of the VRRP message are contained therein. However, to help understand the manner in which VRRP may be extended to accommodate the new message types, a brief description of the VRRP message will be provided.

An IP Multicast address has been assigned by the Internet Assigned Numbers Authority (IANA) for VRRP. Specifically, the IP destination address of all VRRP packets is 224.0.0.18. Virtual routers running VRRP are configured to receive messages addressed to this multicast destination address and process them to determine if the VRRP message is associated with an IP address that they are configured to back up. The IP addresses associated with the VRRP message 30 are contained in the IP address fields 32 and, upon receiving a VRRP message the VRRP routers will scan through the IP addresses to compare the IP addresses in the VRRP message with IP addresses that they are backing up. If the message is an advertisement from the master (type=1) the receiving VRRP backup routers will update their master down timers for those IP addresses that they are backing up which are found in the IP address fields 32.

As shown in FIG. 5, the VRRP message includes a version field 34 and a type field 36. The version field enables the version of VRRP to be specified so that routers receiving the message are able to determine what version of VRRP was used to create the VRRP message. Currently, version 2 is in use extensively, although other versions of VRRP may be created in the future and the invention is not limited to the use of VRRP version 2.

The VRRP message also includes the type field 36. The type field is a four bit field that specifies the type of this VRRP packet. The current version of the standard defines only one type—Type 1 (type field bit value=0001)—which is used to identify Advertisement messages on the network. These Advertisement messages are used by the master router to enable the master router to indicate its current state and continued mastership over a particular address or set of IP addresses listed in the IP address fields 32.

According to an embodiment of the invention, one or more extra message types are defined and added to the VRRP protocol to enable the backup routers to be identified on the network for a particular master router. One of the message types, referred to herein as a VRRP backup query message, may be sent in the LAN to query the possible backup routers. Each router (master or backup) configured with VRRP on an interface in that LAN responds to the query with its priority and other relevant information using another message type, referred to herein as a VRRP response message. Based on the responses, the querying router can build up the knowledge base of the VRRP routers in that LAN.

The RFC has defined 4 bits for message type in the VRRP header. At present, only one of them (value=1) is used. According to an embodiment of the invention, two new message types are used, for example using type value=2 (type field bit value=0010) and type value=4 (type field bit value=0100), to enable a VRRP backup query message to be sent out to the backup routers and to enable the backup routers to respond to the VRRP backup query message. Although type values 2 and 4 have been suggested as possible type values, the invention is not limited in this regard as other type values may similarly be used and these particular type values have been given merely as examples.

In this embodiment, type value=2 may be used to indicate that the message is a query for backup router information, and type value=4 may be used to indicate that the message is a response to this query. The current message format can be easily adapted to include these codes and corresponding data entries. One of ordinary skill in the art will appreciate, however, that the code numbers are not essential and are included herein merely to provide examples of several values that may be used to implement an embodiment of the invention.

When a VRRP query message is sent, the IP address fields of the VRRP query message may be used to contain a list of IP addresses that are the subject of the query. For example, where it is deemed desirable to determine whether any routers are currently backing up a set of IP addresses, the IP addresses of interest may be listed in the IP address fields 32 of the VRRP query message. Any router receiving a message of this type may scan through the IP addresses in the IP fields 32 to determine if it is a VRRP backup router for any of the listed addresses. If so, the VRRP backup router may respond with a VRRP response message listing those IP addresses which it is currently backing up. If the router is not backing up any of the listed IP addresses, the VRRP router may discard the message.

As per the current RFC, any VRRP message with type other than 1 should be dropped. Therefore, a router that is conformant with the RFC but does not have the support for the proposed extensions, may simply drop the VRRP query messages and VRRP response messages. Thus, the proposed extension will not break the current implementation of the VRRP protocol. However, routers that support this additional functionality may use the new message types to build a VRRP backup table and/or to contribute information that may be used by other VRRP routers or network elements to determine which IP addresses the VRRP router is likely to backup. Thus, those VRRP routers that are equipped to support this extension may contribute to the desired knowledge base to enable a graceful transition over time as additional routers are configured to implement this extension.

FIG. 5 shows several of the other fields specified by the current version of the VRRP standard. These fields are well known to persons skilled in the art and, accordingly, will not be described in greater detail herein. Although an implementation in which the message type has been used to implement an embodiment of the invention has been described, the invention is not limited in this regard as one or more of the other fields may be used to implement an embodiment of the invention as well. For example, particular values of the authentication type field may be reserved to indicate that a particular VRRP message is either a VRRP backup query message or a VRRP response message. Similarly, the IP address count field may be used as a flag (i.e. IP address count=0) to indicate that this advertisement message is not a normal advertisement. The IP fields, in this alternative example, may be used to carry additional information to enable the VRRP backup routers to determine which IP addresses are being queried.

According to an embodiment of the invention, if knowing the backup router is conceived as a security issue, a router may be configured either to respond or not to respond to the query. Other security mechanisms may be employed as well, and the invention is not limited to an embodiment that implements security by causing the VRRP backup routers to not respond to VRRP query messages. For example, the VRRP messages may be digitally signed by the VRRP routers to enable the source of the VRRP messages to be identified. Alternatively, the VRRP messages may be encrypted to enable the contents of the VRRP messages to only be read by a select group of network entities. This may be implemented, for example, by causing the VRRP backup query messages to be encrypted by the network management system prior to being transmitted on the LAN, and then causing the VRRP response messages to be encrypted for transmission back to the network management system. Other methods of ensuring security may be used as well and the invention is not limited to any particular way in which security is implemented where such security is desired.

Since the extension is query/response based, implementation would not be expected to generate excessive continuous ongoing traffic in the network. It is possible, however, for all backup routers to send out a VRRP response message at the same time once a VRRP backup query message has been transmitted. This simultaneous transmission of VRRP response messages may cause a burst of traffic to be created, temporarily increasing the traffic load in the LAN as well as in the processing power requirements at the querying router. To smooth this burst, an intelligent (random) delay may be added by each backup router before responding to a VRRP backup query message.

The query/response process described herein may be used in myriad ways. For example, according to an embodiment of the invention, a VRRP monitoring tool may be implemented that is configured to monitor the LAN for available VRRP routers for IP addresses. Using this tool, it is possible to determine whether there is an available backup router for any master VRRP router on the network at any given time and which router is performing that function, yielding more control/monitoring which may be advantageous in a high availability environment. The VRRP monitoring tool can run anywhere in the LAN, for example in the network management system, and may run in any type of network element such as a process in one of the VRRP routers or in a work station that is not a router. Thus, before working on a VRRP router that may be implemented as a master, or before configuring a router as a back up, the system administrator can check the existence/status of other available backup routers, and make intelligent decisions based on the information learned.

Figure 1:
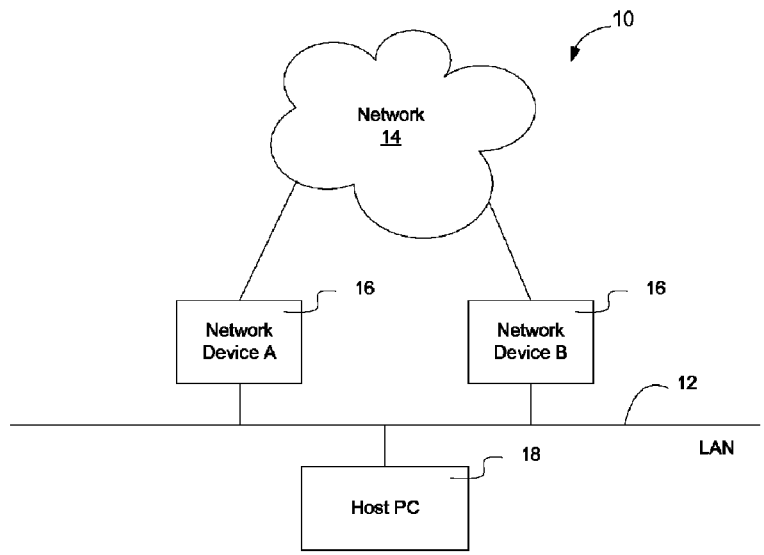
FIGS. 1-2 are functional block diagrams of example networks configured to implement embodiments of the invention.
Figure 2:
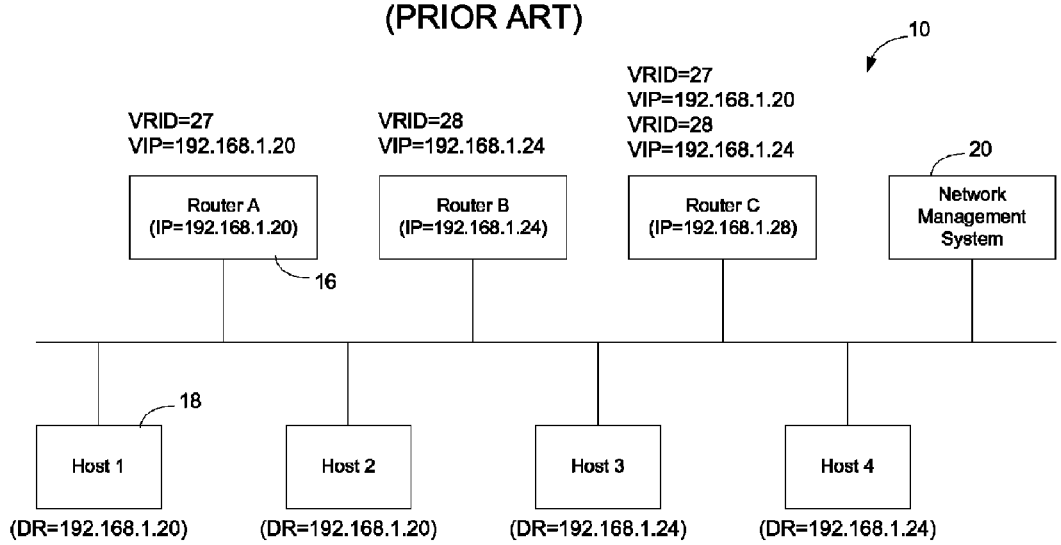

Although an embodiment has been described in which a VRRP query message is addressed to include a list of IP address that are to be queried, the invention is not limited in this manner as, in other circumstances, it may be desirable to determine which IP addresses a particular router is backing up. For example, assume in FIG. 2 that the network manager would like to determine how router C is configured, and to determine whether router C is configured as a VRRP backup router for any IP addresses. According to an embodiment of the invention, the VRRP query message may be sent to the target VRRP router with a wildcard address, that may then be interpreted as a request for that target VRRP router to respond with a VRRP response message listing all IP addresses that the VRRP router is currently backing up. For example, looking at the structure of the VRRP message of FIG. 5, the VRRP message may be addressed to the target router using the target router's unicast address, but including the standard VRRP message format and indicating that the type is a VRRP query message. The Count IP address field may be set to 1, and a wildcard address such as the IANA assigned VRRP multicast address may be listed as IP address number 1 in the IP address fields 32. Other ways of implementing wildcard addresses may be used as well.

Figure 6:
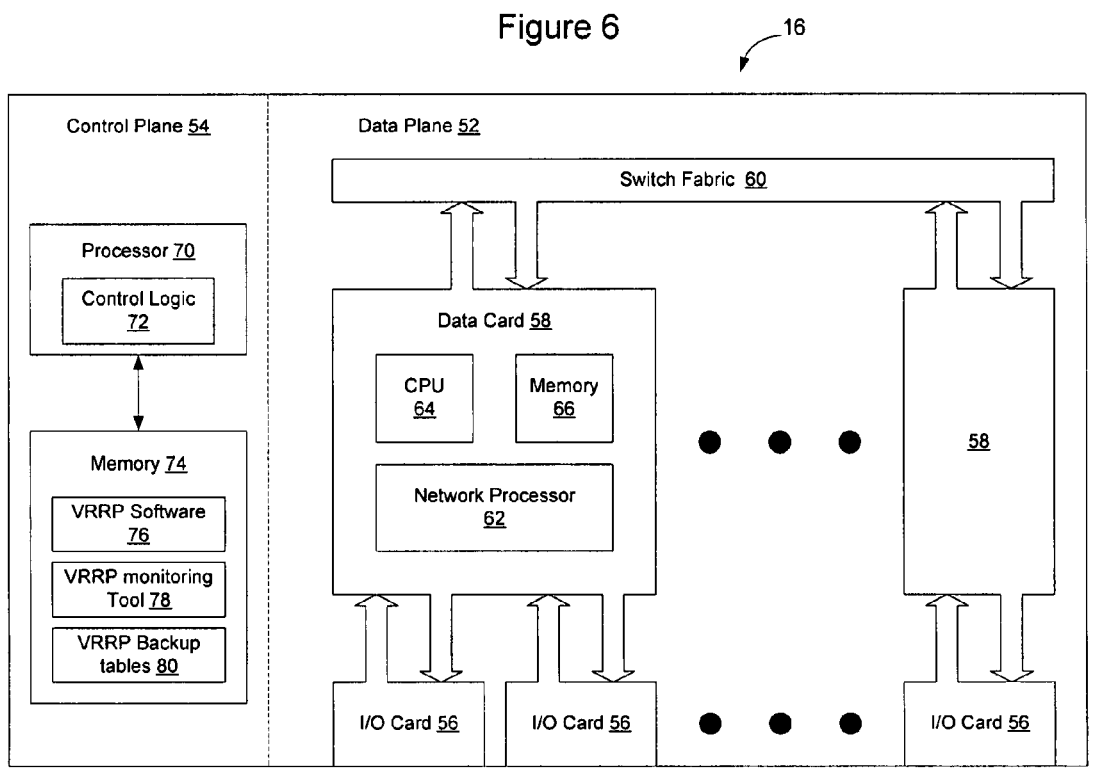
FIG. 6 is a functional block diagram of a network element according to an embodiment of the invention.

One example of a network element 16 that may be used in connection with an embodiment of this invention is illustrated in FIG. 6. As shown in FIG. 6, the network element 16 in this embodiment is implemented to include a data plane 52 and a control plane 54. The data plane 52 generally is configured to receive packets from the network and to output packets onto the network. The data plane 52 in this embodiment includes one or more input/output cards 56, one or more processing cards 58, and a switch fabric 60 configured to switch the packets within the network element to enable packets received via one interface to be output over another interface. The invention is not limited to implementation on a network element using this data plane architecture, however, as many different data plane architectures may be used to implement a network element that can be configured to operate to implement an embodiment of the invention.

The processing cards 58 may include one or more network processors 62, one or more CPUs 64, and memory 66 that, along with other components, enable multiple virtual routers to be implemented on the network element 16. Each of the virtual routers may be a VRRP master router or VRRP backup router, and may issue VRRP backup query messages and/or respond with VRRP response messages as described in greater detail herein.

The control plane 54 may include a processor 70 containing control logic 72 that may enable the control plane 54 to control the manner in which the data plane 52 functions. The control plane may include a memory 74 containing one or more software modules that will enable the control logic to be configured to implement an embodiment of the invention. For example, the memory 74 may include VRRP software 76 to enable the VRRP router to implement the VRRP protocol. As a part of the VRRP software 76, or as a separate body of code, the VRRP router may also include additional functionality to enable the VRRP router to implement the processes described herein. For example, the VRRP router may include a VRRP monitoring tool 78 to enable the VRRP routers to generate and receive VRRP backup query and VRRP response messages, and may also include a VRRP backup tables 80 to enable the VRRP router to maintain a list of which routers are functioning as VRRP masters and which routers are functioning as backup routers for those VRRP masters.

FIG. 6 does not show all of the hardware and software components that may be included in a network element to implement an operational network element. Rather, FIG. 6 shows several of the components that may be used to implement the features discussed in greater detail herein and assumes that the other components/software modules would also be implemented and integrated to enable a functional network element to be created. Thus, the invention is not limited to the particular embodiment illustrated in FIG. 6 as numerous different ways of implementing a network element to achieve the functionality described herein may be created.

The functionality described herein may be implemented as a set of program instructions that are stored in a computer readable memory and executed on a microprocessor, such as CPU 70, CPU 64, or network processor 62. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for learning which Virtual Router Redundancy Protocol (VRRP) backup routers are configured to assume responsibility for a virtual IP address upon failure of a master VRRP router associated with the virtual IP address, the method comprising the steps of:

causing a VRRP query message identifying the virtual IP address to be transmitted on a network to a set of VRRP backup routers on the network, the set of VRRP backup routers including both VRRP backup routers that are configured to assume responsibility for the virtual IP address upon failure of the master VRRP router for the virtual IP address, and VRRP backup routers that are not configured to assume responsibility for the virtual IP address upon failure of the master VRRP router for the virtual IP address; and receiving, in response to the VRRP query message, VRRP response messages relating to the virtual IP address only from the VRRP backup routers in the set that are configured to assume responsibility for the virtual IP address upon failure of the master VRRP router for the virtual IP address, and not receiving the VRRP response messages relating to the virtual IP address from the VRRP backup routers in the set that are not configured to assume responsibility for the virtual IP address upon failure of the master VRRP router for the virtual IP address.

2. The method of claim 1, wherein the step of causing the VRRP query message to be transmitted is performed by the VRRP master router for the virtual IP address.

3. The method of claim 1, wherein the step of causing the VRRP query message to be transmitted is performed by a network management system.

4. The method of claim 3, wherein the step of causing the VRRP query message to be transmitted is performed by a network management system, and wherein the VRRP query message is generated by the VRRP master router for the virtual IP address.

5. The method of claim 1, wherein the VRRP query message has a message type value specific to identify the VRRP query message as requesting information about the VRRP backup routers configured to assume responsibility for the virtual IP address upon failure of the master VRRP router for the virtual IP address, the master VRRP router being the router that is responsible for handling IP traffic addressed to the virtual IP address.

6. The method of claim 1, wherein the VRRP response message has a message type value specific to identify the VRRP response message as containing information about at least one of the VRRP backup routers configured to assume responsibility for the virtual IP address upon failure of the master VRRP router for the virtual IP address, the master VRRP router being the router that is responsible for handling IP traffic addressed to the virtual IP address.

7. A method for learning a Virtual Router Redundancy Protocol (VRRP) backup router for a virtual IP address, the method comprising the steps of:
　transmitting, by a VRRP master router for the virtual IP address, a VRRP query message addressed to a set of potential VRRP backup routers, said VRRP query message identifying the virtual IP address, the set of potential VRRP backup routers including both VRRP backup routers that are configured to assume responsibility for the virtual IP address upon failure of the master VRRP router for the virtual IP address, and a second subset of VRRP backup routers that are not configured to assume responsibility for the virtual IP address upon failure of the master VRRP router for the virtual IP address;
　transmitting a VRRP response message in response to the VRRP query message, by at least one of VRRP backup routers that is configured to assume responsibility for the virtual IP address upon failure of the master VRRP router for the virtual IP address; and
　not transmitting the VRRP response message in response to the VRRP query message by all VRRP backup routers that are not configured to assume responsibility for the virtual IP address upon failure of the master VRRP router for the virtual IP address.

8. The method of claim 7, wherein the VRRP response message is unicast to the VRRP master router.

9. The method of claim 7, wherein the VRRP response message is broadcast.

10. The method of claim 7, wherein the VRRP master router and the set of potential VRRP backup routers are virtual routers instantiated in a network element.

11. The method of claim 7, wherein the VRRP query message has a message type value specific to identify the VRRP query message as requesting information about the VRRP backup routers configured to assume responsibility for the virtual IP address upon failure of the master VRRP router for the virtual IP address, the master VRRP router being the router that is responsible for handling IP traffic addressed to the virtual IP address.

12. The method of claim 7, wherein the VRRP response message has a message type value specific to identify the VRRP response message as containing information about at least one of the VRRP backup routers configured to assume responsibility for the virtual IP address upon failure of the master VRRP router for the virtual IP address, the master VRRP router being the router that is responsible for handling IP traffic addressed to the virtual IP address.

13. A method for providing information about a Virtual Router Redundancy Protocol (VRRP) router, the method comprising the steps of:
　receiving, by the VRRP router, a VRRP query message identifying a virtual IP address and requesting information about the existence of a VRRP backup router for the virtual IP address;
　determining, by the VRRP router, whether the VRRP router is configured to assume responsibility for the virtual IP address upon failure of a master VRRP router for the virtual IP address; and
　in response to said VRRP query message, transmitting by the VRRP router a VRRP response message indicating that the VRRP router is the VRRP backup router for the virtual IP address only if the VRRP router determines that it is configured to assume responsibility for the virtual IP address upon failure of the master VRRP router for the address, and not transmitting the VRRP response message by the VRRP router if the VRRP router determines that it is not configured to assume responsibility for the virtual IP address upon failure of the master VRRP router for the address.

14. The method of claim 13, wherein the VRRP query message is received from the VRRP master router associated with the virtual IP address.

15. The method of claim 13, wherein the VRRP response message is unicast to a network management system.

16. The method of claim 13, wherein the VRRP backup router is a virtual router instantiated in a network element.

17. The method of claim 13, wherein the VRRP query message has a message type value specific to identify the VRRP query message as requesting information about the VRRP backup routers configured to assume responsibility for the virtual IP address upon failure of the master VRRP router for the virtual IP address, the master VRRP router being the router that is responsible for handling IP traffic addressed to the virtual IP address.

18. The method of claim 13, wherein the VRRP response message has a message type value specific to identify the VRRP response message as containing information about at least one of the VRRP backup routers configured to assume responsibility for the virtual IP address upon failure of the master VRRP router for the virtual IP address, the master VRRP router being the router that is responsible for handling IP traffic addressed to the virtual IP address.

* * * * *